March 30, 1954  R. P. STEADMAN  2,673,652
BREAD DEPANNER
Filed Dec. 24, 1951  3 Sheets-Sheet 1
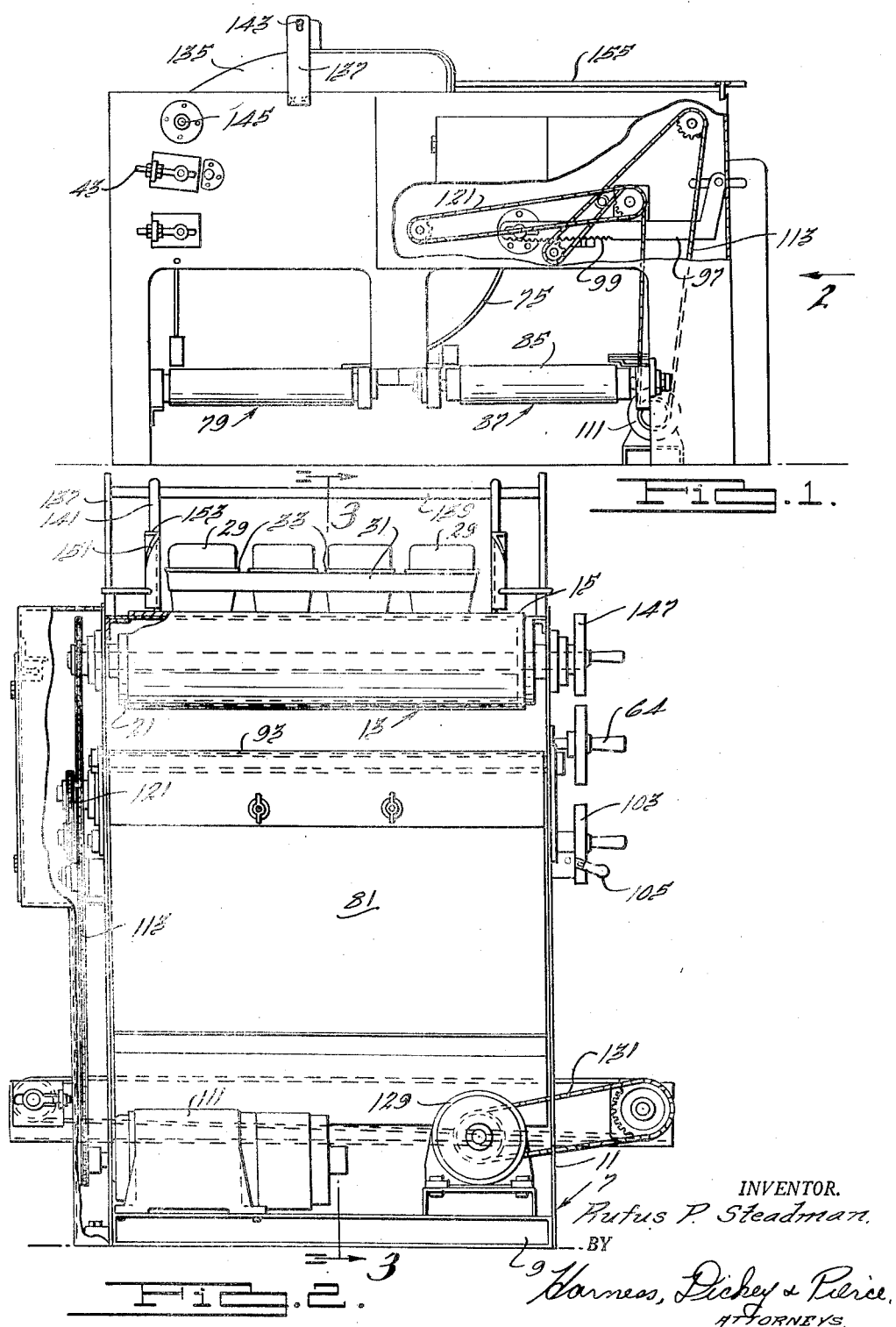
INVENTOR.
Rufus P. Steadman
BY
Harness, Dickey & Pierce
ATTORNEYS.

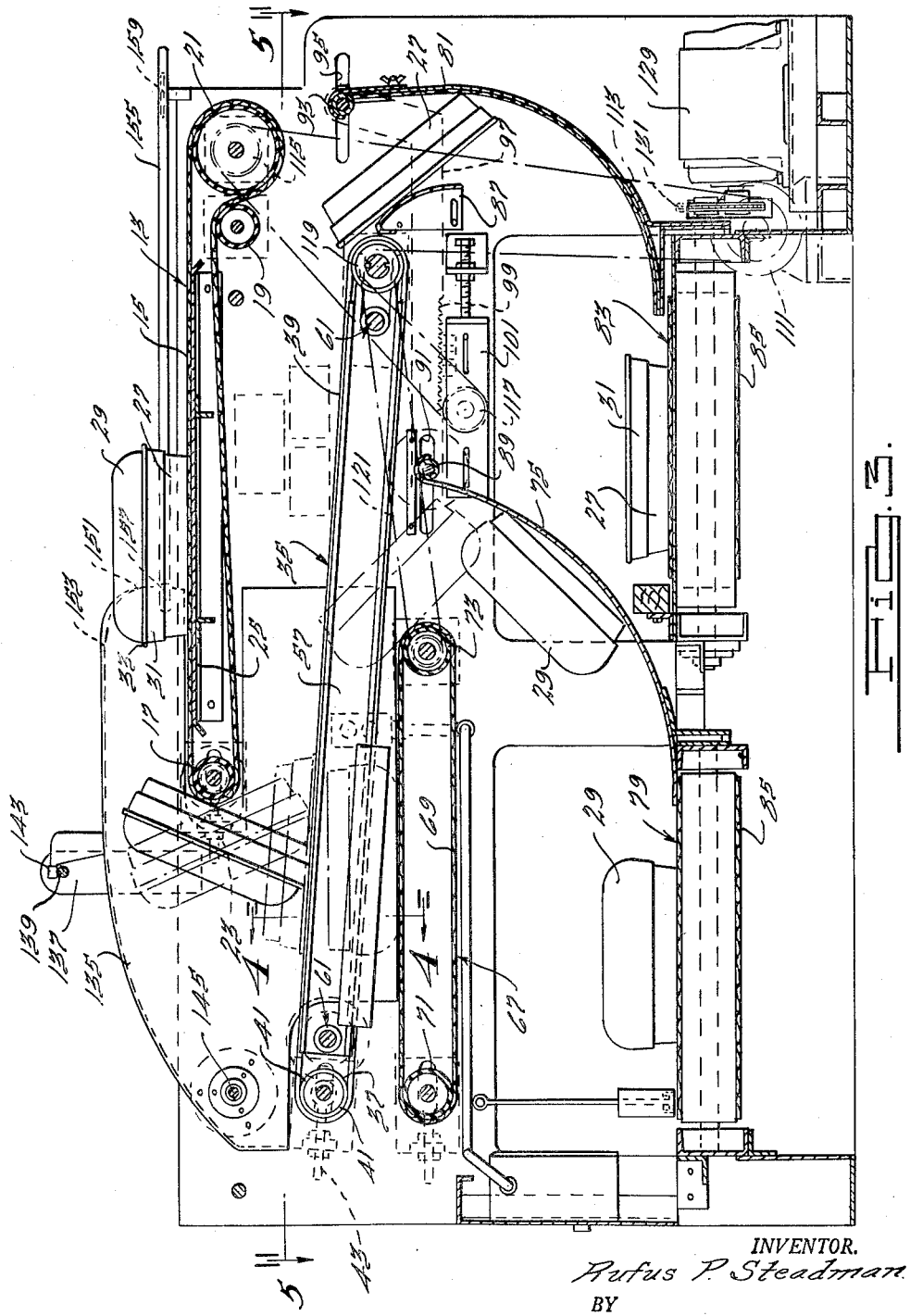

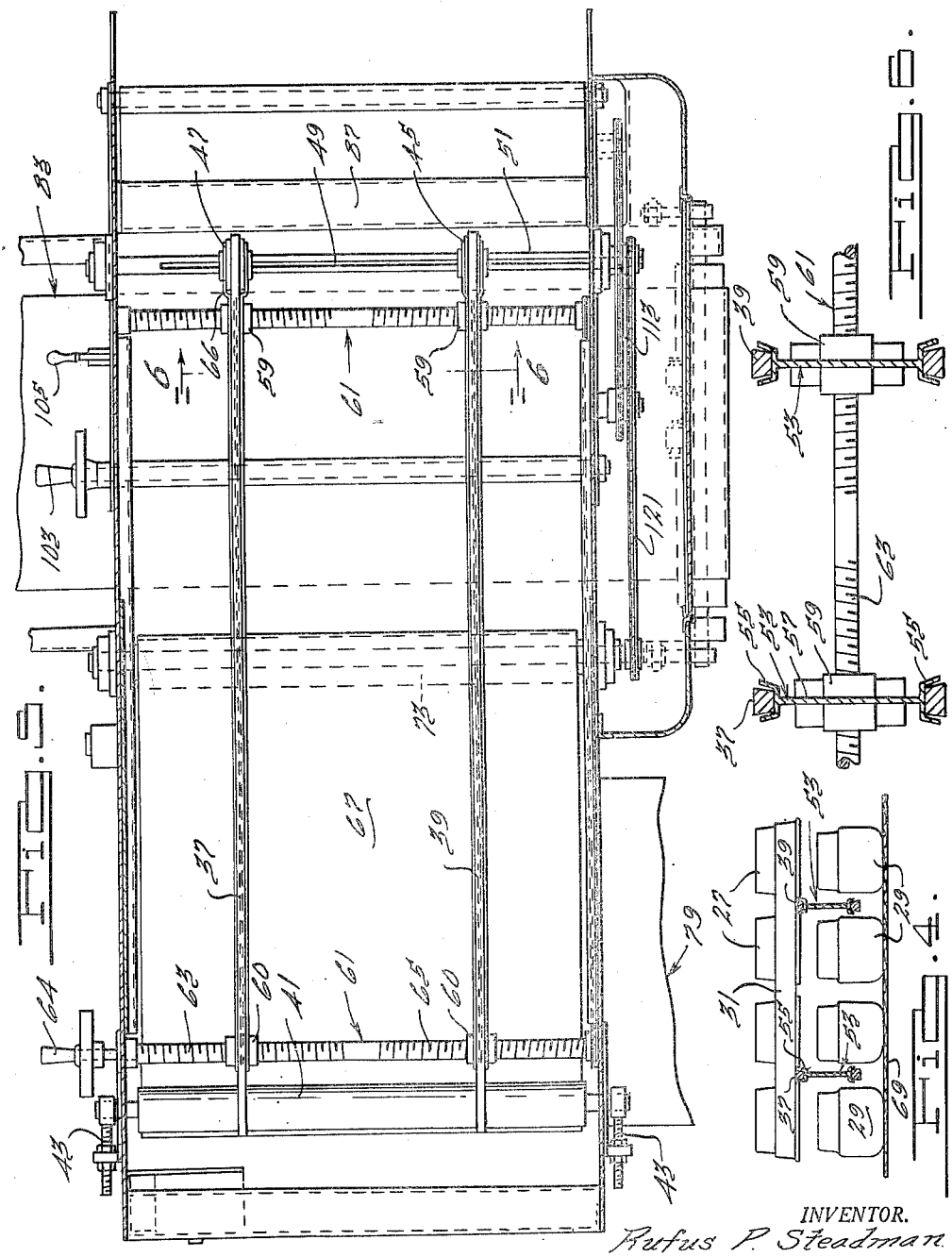

Patented Mar. 30, 1954

2,673,652

UNITED STATES PATENT OFFICE 2,673,652

BREAD DEPANNER

Rufus P. Steadman, Saginaw, Mich., assignor to Baker Perkins Inc., Saginaw, Mich., a corporation of New York Application December 24, 1951, Serial No. 263,063

4 Claims. (Cl. 214—308)

This invention relates generally to conveying apparatus and more particularly to bread depanners which receive pans of baked bread from the oven and automatically unload the loaves of bread from the pans and deliver the loaves and pans to separate conveyors which carry them away from the depanning apparatus.

It is an object of this invention to provide in a bread depanner a novel mechanism for inverting loaded pans so as to separate the bread from the pans and convey the pans and bread separately away from the depanning apparatus.

It is a still further object of this invention to provide in a depanner apparatus, a novel pan conveyor which receives loaded pans in an inverted position and permits the bread to pass downwardly therethrough to a separate bread conveyor, while conveying the empty pans in a predetermined direction.

It is a still further object to provide an improved conveyor the aforementioned type for a bread depanner, in which flexible belts or V-belts are employed for receiving and conveying the inverted pans, so as to eliminate unnecessary and undesirable shocks, noise and possible pan damage, which is occasioned in devices using other types of conveyor elements, such as chains or rails.

It is a still further object of this invention to provide in a bread depanner conveyor of the aforementioned type, means for adjusting the spacing between the flexible conveyor belts, so that the conveyor can handle pans of different sizes and arrangements.

It is a still further object of this invention to provide in a bread depanner of the aforementioned type, improved adjustable means for guiding the loaded pans, unloaded pans, and bread, during their course of travel through the depanning operation, so as to prevent any jamming of the pans or any damage to the bread loaves, and so as to maintain the pans and bread loaves in their proper predetermined positions to insure the efficient operation of the apparatus.

It is a still further object of this invention to provide a bread depanner which is durable in construction, automatic and efficient in operation, and which will automatically depan and handle bread loaves and pans in a more efficient manner than has been heretofore possible.

These and other objects of this invention will become apparent from the following detailed description, taken in conjunction with the accompanying drawings, in which:

Figure 1 is a side elevational view, with parts broken away in section, of the bread depanner apparatus of this invention;

Fig. 2 is an enlarged end view, partially in section and partially in elevation, of the structure illustrated in Figure 1, taken in the direction of the arrow 2 thereof;

Fig. 3 is a sectional view of the structure illustrated in Fig. 2, taken along the line 3—3 thereof;

Fig. 4 is a sectional view of the structure illustrated in Fig. 3, taken along the line 4—4 thereof;

Fig. 5 is a sectional view of the structure illustrated in Fig. 3, taken along the line 5—5 thereof; and Fig. 6 is an enlarged sectional view of the structure illustrated in Fig. 5, taken along the line 6—6 thereof.

Referring now to the drawings, it will be seen that the depanner apparatus includes a suitable supporting framework structure 7, including a base 9, and side supporting members 11. A first conveyor 13 is provided in the upper portion of the depanner apparatus and includes an endless belt 15, made of canvas or some other suitable material, which extends at its back end around a terminal pulley 17, and at its front end around an idler pulley 19 and a driving pulley 21. The pulleys 17, 19 and 21 are rotatably supported on the side plates 11 by means of suitable shafts, and a take-up mechanism 23 is connected with the pulley 17 for controlling the tightness of the belt 15 and for permitting the belt to be loosened if it needs to be changed. The upper run of belt 15 extends over a supporting or backing plate 25, which is connected with the depanner framework and which extends from a point adjacent the terminal pulley 17 to a joint adjacent the driving pulley 21, so that when pans 27 containing bread loaves 29 are conveyed by the belt 15 from the front of the machine toward the rear of the machine, or as viewed in Fig. 3, from right to left, the pans will be properly supported during such movement.

The pans 27 are delivered to the conveyor 13 after the bread has been baked in an oven, and are normally disposed in a group relationship, as shown in Fig. 2. While the number of pans in any group may vary, as well as the sizes thereof, and while the pans may be interconnected by any suitable means, the pans 27 are illustrated in the drawings as being in a group of four, disposed in a side-by-side spaced relationship and interconnected by suitable strap means 31. The pans are of the conventional type, having an open top with a peripheral bead 33 extending around the upper edge thereof.

A second conveyor 35 is disposed below the first conveyor 13 and includes a pair of endless flexible V-belts 37 and 39 which are laterally spaced relative to each other. The V-belts 37 and 39 extend around an idler pulley 41, in the form of an elongated cylindrical roller, which is rotatably supported on the depanner frame side members 11, in any suitable manner, adjacent the back of the device. A suitable take-up mechanism 43 is connected with the pulley 41 at each side thereof, for controlling the tightness of the V-belts 37 and 39. The V-belts 37 and 39 extend around grooved pulley members 45 and 47, adjacent the front of the device. The pulleys 45 and 47 are formed with tangs or tongues which project slidably into grooves 49 formed in a laterally extending drive shaft 51. The drive shaft 51 is rotatably supported by the depanner framework and is adapted to be driven by a suitable drive mechanism which will be hereinafter described.

A backing member 53, which includes opposed, longitudinally extending sheet metal troughlike portions 55, engages the upper and lower runs of the V-belts 37 and 39 to support and back the same, both on the lateral sides of the belts and on the inner face thereof. The troughlike portions 55 are interconnected by a vertical web portion 57 and adjacent each of the pulleys internally threaded nuts 59 and 60 are connected with the webs 57. A laterally extending rod 61 is rotatably supported in the depanner framework adjacent the opposite ends of the conveyor 35. Each of the rods 61 includes a right hand threaded portion 63, and a left hand threaded portion 65. The threaded portions 63 and 65 are threadably connected with the nuts 59 and 60 respectively, and a hand wheel 64 is connected to one of the rods 61 exteriorly of the depanner framework side members 11. The other rod 61 is turned in unison by means of a pair of sprockets on each rod and connected by a chain. By turning the hand wheel 64 in one direction or the other, the nuts 59 and 60 will be moved toward or away from each other due to the opposite hands of the threads 63 and 65. Such movement of the nuts will cause the V-belts to move toward or away from each other. The V-belts will merely slide toward or away from each other on the pulley 41, while at the opposite end of the conveyor sheet metal fork members 66, which are connected with the nuts 59 and 60 adjacent to the drive shaft 51, straddle the drive shaft adjacent the pulleys 45 and 47 so that movement of the nuts at the front end of the conveyor will cause the pulleys 45 and 47 to slide relative to the drive shaft and thereby adjust the spacing between the V-belts. The adjusting mechanisms are provided to permit the spacing between the V-belts to be varied so that the conveyor 35 may handle pans of different sizes or arrangements in a manner that will be hereafter brought out.

When the loaded pans 27 are conveyed by the first conveyor 13 toward the rear of the machine they will drop or fall from the rear end of the conveyor 13 as they pass over the terminal pulley 17. The distance between the terminal pulley 17 and the upper run of the second conveyor 35 is preferably less than the length of the pans 27, so that when the pans pass over the terminal pulley 17 the forward ends thereof will drop onto the upper run of the conveyor V-belts 37 and 39, as shown in Fig. 3, while the opposite ends of the pans engage the back end of the conveyor 13. The upper runs of the V-belts 37 and 39 move in a direction from the back to the front of the depanner, or as viewed in Fig. 3, from left to right, so as to move in a direction opposite to the direction of movement of the first conveyor 13. Therefore, when the forward ends of the pans 27 drop onto and engage the V-belts 37 and 39, the movement of the V-belts toward the front of the depanner will cause the pans to move and be inverted to an upside down position as shown in Fig. 3. As the pans move to this inverted upside down position, the V-belts engage the strap 31, which interconnects the pans, and the beads 33 on the adjacent pans prevent sidewise movement of the pans relative to the belts. In the illustrated embodiment, and as can be seen in Fig. 4, the V-belts are spaced to engage the strap 31 between the inner edges of the outer two pans and the outer edges of the inner two pans, so that the outer pans, or the pans at each end of the group are disposed outwardly of the V-belts, while the two inside pans are disposed inwardly of the V-belts.

It should be noted that the V-belts engage the straps 31 only and do not contact the loaves of bread in the pans, and are therefore out of interfering relationship with the loaves of bread so that when the pans move to their inverted position the loaves of bread can drop or fall from the pans downwardly beyond the V-belts 37 and 39. By properly adjusting the spacing of the V-belts 37 and 39 in accordance with the spacing of the pans, this proper engagement can be effected so that the pans will be supported by the V-belts out of interfering relationship with the loaves of bread. It should also be noted that the terminal roller 17 of the first conveyor 13 is disposed above the second conveyor 35 and intermediate the ends of the conveyor 35, so that when the pans drop from the first conveyor to the second conveyor they engage the upper run of the second conveyor between the opposed pulleys. Due to the fact that the second conveyor 35 employs V-belt type conveying elements, the shock imparted to the pans and bread, when the same are dropped from the first conveyor, is reduced. Similarly, as these V-belts are generally leather or rubber, there is no appreciable noise when the pans strike the V-belts, such as would be the case if chains or rail type conveyors were used. Because the bread pans are normally silicon glazed, the bread will fall from the pans downwardly beyond the conveyor 35 when the pans are inverted. However, if for some reason the bread should stick in the pans the pulleys 45 and 47 at the forward end of the conveyor 35 are of a large enough diameter to permit the loaded pans, in their inverted position, to pass over the drive shaft 49 without damaging the bread so that the bread can be removed at a later time from the pans, by hand if necessary.

A third conveyor 67 is disposed below the second conveyor 35 in a position to receive the loaves of bread 29 which drop downwardly through the second conveyor 35 from the pans 27. The conveyor 67 may be of any suitable type and is shown as being of the suitable belt type in which a belt 69 extends around pulleys 71 and 73 adjacent opposite ends thereof. The pulley 73 is the conveyor driving pulley and likewise is the terminal pulley over which the bread is conveyed as the upper run of the conveyor moves from the back of the machine toward the front thereof, or as viewed in Fig. 3, from left to right. The empty pans, therefore, are conveyed by the conveyor 35 while the bread which drops below the conveyor 35 is received on and separately conveyed by the conveyor 67.

As the bread is conveyed by the conveyor belt 69 over the terminal pulley 73, its forward end drops onto an arcuate sheet metal sheet or slide 75, down which the loaves of bread slide in their upright position onto a conveyor 79, of any suitable type. The conveyor 79 then carries the loaves of bread 29 away from the depanner apparatus, in any desired direction. Simultaneously, the empty pans 27 which are carried by the second conveyor 35, pass over the pulleys 47 and 45 on the drive shaft 49, in the same manner as the loaves of bread pass over the pulleys 73. The pans drop from the conveyor 35 into a canvas sheet or slide 81, and slide down the slide 81 onto a conveyor 83, which carries the pans away from the depanner device. The conveyor 83 may be of any suitable type and generally is of the same type as the conveyor 79. The conveyors 79 and 83 are illustrated as being of a suitable belt type wherein the belts 85 thereof pass around pulleys, one of which is driven by a suitable motor to operate the conveyor. A baffle 87 is supported on the depanner framework adjacent the forward end of the second conveyor 35 and the slide 81 to insure the proper turning of the pans as they pass from the conveyor 35 down the chute and to insure that the pans will be in their upright position.

The bread slide 75 is supported at its upper end on a rod or pipe 89 which in turn is supported on the depanner framework side members 11 in longitudinally elongated slots 91. The upper end of the pan slide 81 is similarly supported by a rod or pipe 93 on the side frame members through an elongated slot 95. The rod or pipe members 93 and 89 are interconnected by means of a rigid platelike member 97, which has ratchet teeth 99 formed on a portion of the under side thereof. The ratchet teeth 99 mesh with complemental teeth on a slide 101, which is suitably supported on the depanner side frame members. An adjusting mechanism which includes a hand wheel 103, see Fig. 2, is provided so that by actuation of the hand wheel 103 the slide 101 can be moved fore and aft to thereby move the member 97 and the slide supporting rods or pipes 93 and 89 fore and aft in their respective slots in the depanner framework, to thereby vary the position of the slides 75 and 81 relative to the terminal pulleys of their respective conveyors. This adjustment of both slides is effective simultaneously because if longer loaves of bread are employed, longer pans are employed, and conversely. Therefore, the slides can be adjusted to be in the proper position to receive the bread and pans from the conveyors 67 and 35 respectively, so that the bread and pans will slide in their upright position down the slides 75 and 81 respectively. In order to lock the slide 101 in a predetermined position and prevent undesired movement thereof, an actuatable lock element 105 is provided.

In order to drive the conveyors 13, 35 and 67, a motor 111 is provided, the output shaft of which carries a sprocket around which a chain 113 extends. The chain 113 extends upwardly from the motor 111 and around a sprocket 115 which is connected with the first conveyor drive pulley 21. The chain extends around the sprocket 115 and downwardly around an idler sprocket 117. The chain then extends upwardly around a sprocket 119, which is connected with the second conveyor drive shaft 49 for driving the same, and thence back down around the motor sprocket. Thus an endless chain is provided for driving the first and second conveyors. A chain 121 also connects the drive shaft 49 of the second conveyor with the drive shaft for the pulley 73 of the conveyor 67, so as to drive the pulley 73 and the conveyor belt 69. Thus the motor 111 drives the conveyors 13, 35 and 67 with the conveyor 13 moving in an opposite direction to the conveyors 35 and 67. The pan conveyor 83 is shown as being driven by a motor 129 which is connected with the drive shaft of the conveyor 83 by a suitable chain 131. A similar motor, not shown, is provided for driving the bread conveyor 79. This motor operates the conveyor 79, in the same manner that the motor 129 operates conveyor 83.

When the loaded pans move along the first conveyor 13 and are inverted and drop onto the second conveyor 35, so that the bread falls onto the third conveyor 67, it is important that the pans and bread be properly guided during this depanning operation to insure that the pans will drop onto the V-belts 37 and 39, so that the V-belts will engage the pans, as previously described, and be out of interfering relationship with the bread loaves, and so that the bread will drop into proper position on the conveyor 67 and will not be turned or cocked. To accomplish this a guide plate 135 is provided adjacent each side of the conveyors 13, 35 and 67 adjacent the rear of the machine. The guide plates 135 are supported on the side depanner frame members and are adjustable laterally relative to the conveyors so as to accommodate various sizes of pans and so as to closely guide the pans and bread through the depanning operation. Connected with the side frame members 11 are upwardly extending platelike brackets 137 which have extending therebetween, above the guide plates 135, a rod or shaft 139. Connected with the guide plates 135 and projecting upwardly therefrom are brackets 141 which carry rollers 143 which in turn roll on the cross shaft 139. A laterally extending adjusting screw 145 is supported on the side frame members and has an exteriorly disposed hand wheel 147. The adjusting screw 145 is similar to the adjusting screws 61 previously described and has threaded portions of the opposite hand which are threadably connected with the opposite guide plates 135, so that upon actuation of the hand wheel in one direction or the other, the guide plates will be moved toward or away from each other to properly guide and accommodate the pans irrespective of the width or size thereof. Such movement of the guide plates is permitted by the rolling engagement of the rollers 143 on the supporting cross rod 139. The forward ends of each of the guide plates 135 are flared outwardly at 151 to provide a suitable entrance for the pans between the guide plates, and a reinforcing or stiffening flange 153 extends around the guide plates to stiffen the same. In order to maintain the pans on the conveyor 13, during their initial movement therealong, guide rails 155 are provided on opposite sides of the conveyor 13. The guide rails are pivotally or hingedly connected at 157 to the guide plates 135 by any suitable means, and the forward ends of the guide rails 155 are connected with the depanner frame side members at 159 through a slotted connection, so that when the guide plates 135 are adjusted inwardly or outwardly they can pivot relative to the guide rails 155 at 157 and the slotted connection 159 of the guide rails with the depanner frame members allows the guide rails to move fore and aft relative to the frame members to accommodate such pivotal movement at the rear ends of the guide rails. The guide plates 135, as can be best seen in Fig. 3, extend downwardly so as to provide a guide for the first, second and third conveyors, and the lower ends of the guide plates terminate adjacent the upper run of the conveyor 67. Thus the guide plates act to insure the proper guidance of the pans and bread through the depanning operation, the engagement of the pans with the V-belts, and the receiving of the bread loaves on the conveyor 67.

It will thus be seen that a completely automatic depanner apparatus is provided, which is adapted to accommodate bread loaves and pans of different lengths, sizes and arrangements, and which is not noisy in operation because of the use of flexible V-belts, and likewise in which the life of the pans and the conveyors is extended because shock during the depanning operation is materially reduced or eliminated. The depanning apparatus of this invention is thus exceptionally efficient in operation, has great durability and life, and is simple in construction.

What is claimed is:

1. In an apparatus for unloading bread loaves from pans having an open top, conveyor means for conveying loaded pans in a predetermined lineal direction, second conveyor means disposed below said first conveyor means and including spaced apart flexible belts extending endlessly around opposite pulley means, means for driving said flexible belts in a direction opposite to that of said first conveyor means, said first conveyor means terminating at one end above said second conveyor means and intermediate the ends thereof so that loaded pans will drop from said first conveyor means onto said second conveyor means, the movement of which will cause the pans to invert and be supported on said flexible belts in an upside down position, said flexible belts being spaced so as to engage the pans and be out of interfering relationship with the bread loaves, so that the loaves can drop from the pans downwardly beyond said second conveyor means, and third conveyor means disposed below said second conveyor means for receiving the loaves which drop from the pans.

2. In an apparatus for unloading bread loaves from pans having an open top, conveyor means for conveying loaded pans in a predetermined lineal direction, second conveyor means disposed below said first conveyor means and including spaced apart flexible belts extending endlessly around opposite pulley means, means for driving said flexible belts in a direction opposite to that of said first conveyor means, said first conveyor means terminating at one end above said second conveyor means and intermediate the ends thereof so that loaded pans will drop from said first conveyor means onto said second conveyor means, the movement of which will cause the pans to invert and be supported on said flexible belts in an upside down position, said flexible belts being spaced so as to engage the pans and be out of interfering relationship with the bread loaves, so that the loaves can drop from the pans downwardly beyond said second conveyor means, means for adjusting the positions of the flexible belts relative to each other so as to permit said conveyor means to accommodate pans of various sizes and arrangements.

3. In an apparatus for unloading bread loaves from pans having an open top, conveyor means for conveying loaded pans in a predetermined lineal direction, second conveyor means disposed below said first conveyor means and including spaced apart V-belts extending endlessly around opposite pulley means, means for driving said V-belts in a direction opposite to that of said first conveyor means, said first conveyor means terminating at one end above said second conveyor means and intermediate the ends thereof so that loaded pans will drop from said first conveyor means onto said second conveyor means, the movement of which will cause the pans to invert and be supported on said V-belts in an upside down position, said V-belts being spaced so as to engage the pans and be out of interfering relationship with the bread loaves, so that the loaves can drop from the pans downwardly beyond said second conveyor means, means for adjusting the positions of the V-belts relative to each other so as to permit said conveyor means to accommodate pans of various sizes and arrangements.

4. In apparatus for unloading bread loaves from pans having an open top, a first belt conveyor including a belt extending around spaced apart pulley means, a second belt conveyor disposed below said first belt conveyor, means for driving said first belt conveyor in one direction and said second belt conveyor in an opposite direction, said first belt conveyor terminating at one end above and intermediate the ends of said second belt conveyor so that loaded pans conveyed by said first belt conveyor will drop onto said second belt conveyor and the movement of said second belt conveyor will cause said pans to be inverted to an upside down position, said second belt conveyor including a pair of flexible belts spaced apart to engage the pans and be out of interfering relationship with the bread loaves so that the loaves can drop from the pans downwardly beyond the belts, guide plate means disposed adjacent opposite sides of the terminal end of said first conveyor means and the portion of said second conveyor means disposed therebelow, said guide plate means being supported for lateral movement relative to said conveyor means and to each other, and means for adjusting the lateral positions of said guide plate means to accommodate pans of various sizes and arrangements so that the pans will be properly guided during their movement along the terminal end of said first conveyor means and the portion of said second conveyor means disposed therebelow.

RUFUS P. STEADMAN.

References Cited in the file of this patent

UNITED STATES PATENTS

| Number | Name | Date |
|---|---|---|
| 456,336 | Paris | July 21, 1891 |
| 1,497,438 | Gottschalk | June 10, 1924 |
| 2,172,685 | Thompson | Sept. 12, 1939 |
| 2,378,948 | Paxton et al. | June 26, 1945 |
| 2,524,656 | Eyster | Oct. 3, 1950 |